M. SCHAAR.
TRANSMISSION SYSTEM.
APPLICATION FILED SEPT. 2, 1913.

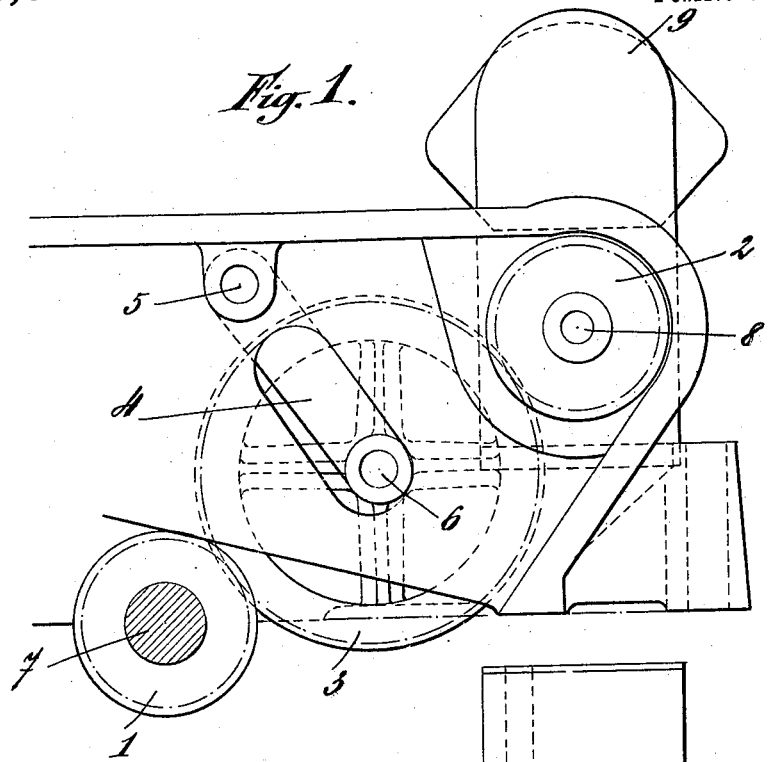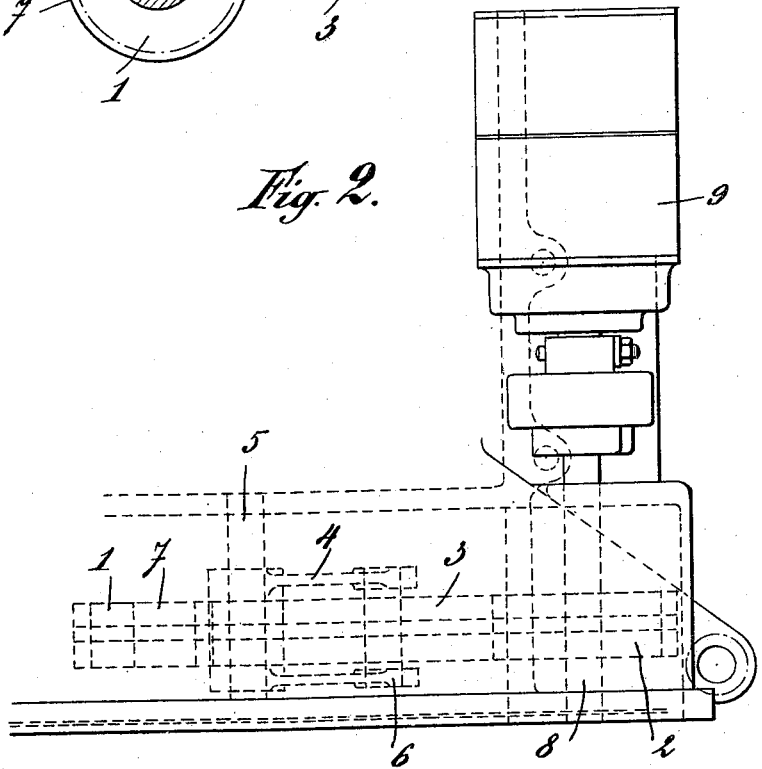

1,245,804.

Patented Nov. 6, 1917.
2 SHEETS—SHEET 2.

Witnesses:

Inventor
Maurice Schaar
by his Attorney

UNITED STATES PATENT OFFICE.

MAURICE SCHAAR, OF BRUSSELS, BELGIUM.

TRANSMISSION SYSTEM.

1,245,804.   Specification of Letters Patent.   Patented Nov. 6, 1917.

Application filed September 2, 1913. Serial No. 787,603.

*To all whom it may concern:*

Be it known that I, MAURICE SCHAAR, subject of the King of the Belgians, residing at 57 Rue Américaine, Brussels, Belgium, have invented certain new and useful Improvements in Transmission Systems, of which the following is a specification.

The present invention relates to a transmission system which allows the uniform velocity of a driving member to be transformed into a uniformly varied velocity of the driven member by means of a single eccentric intermediate pinion which is always in mesh both with the driving pinion and with the driven pinion.

Figure 3:
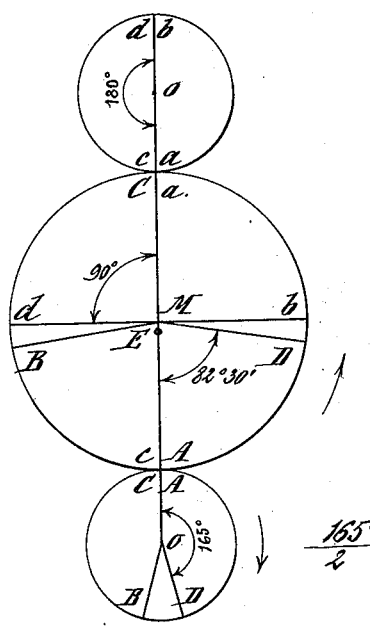
Figure 4:
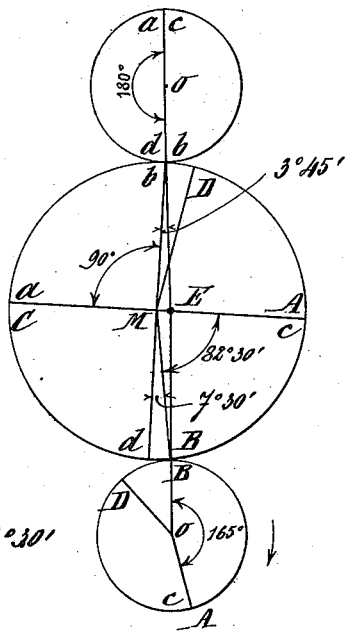
Figure 5:
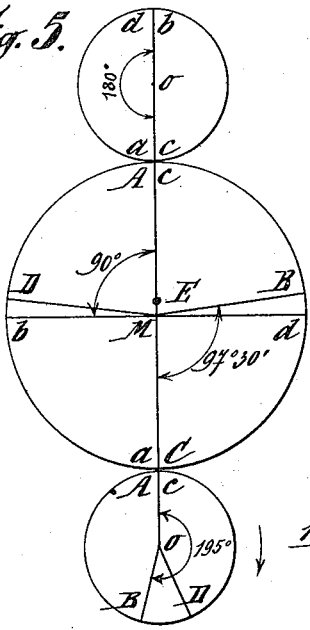
Figure 6:
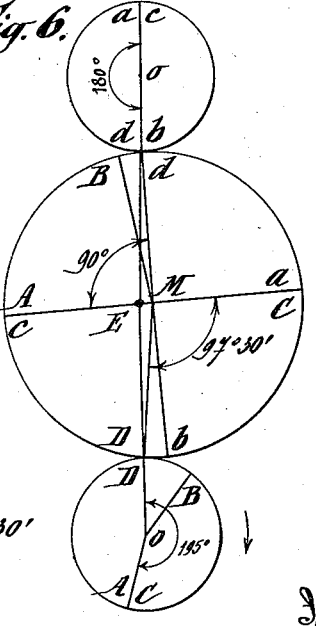

In the accompanying drawings Figure 1 shows the application of the system to control a magneto machine for the ignition of an internal combustion engine; Fig. 2 is a plan view corresponding to Fig. 1; Figs. 3, 4, 5 and 6 are diagrammatic views of the arrangement of pinions according to Figs. 1 and 2 showing the relative angles described by the different pinions corresponding to the successive ignition in the different cylinders.

In the application of the invention shown by way of example in these drawings, a pinion 1 mounted on the crank shaft 7 drives a similar pinion 2 mounted on the shaft 8 of the magneto 9. Between the pinions 1 and 2 is inserted a toothed wheel 3 of which the axis 6, which is eccentric as will be explained later, is mounted in the arms of a fork 4 pivoted at 5 on the frame. The diameter of the toothed wheel 3 is, in the example shown, double that of the pinions 1 and 2.

Metallic rings of the exact diameter of the outside diameters of these three wheels in combination with the teeth of the latter force the intermediate wheel 3 to be always in the center of the space between the two others. In this way, during the rotation of the pinions, the eccentric axis 6 of the wheel 3 will be free to rise and fall on the line joining the axis of the two pinions 1 and 2, while the true center of the wheel 3 (M in Figs. 3–6) will be displaced practically in a direction at right angles to the center of this line.

The gear 3 being eccentrically mounted upon the swinging arms 4 and in constant mesh with the gears 1 and 2, it is apparent that with the rotation of the gear 1 at a constant uniform speed, there will be imparted to the gear 2 a variable speed determined by the degree of eccentricity of the gear 3. This gear rotates about the axis 6, the oscillations of the arm 4 compensating for the eccentricity and maintaining said gear in constant mesh with both of the other gears 1 and 2, since the gear 3 is eccentrically mounted, the effect of this gear between the gears 1 and 2 will be similar to a lever, the axis 6 being the fulcrum point, hence when teeth upon the entire radius of said gear are in mesh with the gear 1, the teeth upon the diametrically and shorter radius of said gear will be in mesh with the gear 2, thus causing said last named gear to rotate at a lower speed than the gear 1. This speed as the radii from the center is gradually increased will be uniformly decreased and as the teeth of the shorter radii mesh with the gear 1, this speed of the gear 2 will be gradually increased. Hence the relative speed of the gear 1 with the gear 2 will be lower when the parts are as shown in the position in Fig. 2 and will be higher when the parts are in a reverse position.

Having thus described the nature of this invention and the best means I know of carrying the same into practical effect, I claim:—

1. A transmission system for transforming a movement of rotation at uniform speed into a movement of rotation at a uniformly varied speed comprising a driving pinion and a driven pinion, and an interposed toothed wheel turning about an eccentric axis and free to rise and fall on the line joining the centers of the two fixed pinions, the wheel being always in engagement with the two pinions.

2. A transmission system for transforming a movement of rotation at uniform speed into a movement of rotation at a uniformly varied speed, comprising a driving pinion and a driven pinion, a toothed wheel turning about an eccentric axis, and a fork pivoted on the frame and supporting said toothed wheel, said toothed wheel being always in engagement with said driving and said driven pinions.

3. A transmission system for transforming a movement of rotation at uniform speed into a movement of rotation at a uniformly varied speed, comprising a driving pinion and a driven pinion, a toothed wheel turning about an eccentric axis, a fork pivoted on the frame and supporting said toothed wheel, and circular rings for maintaining the intermediate wheel in the center of the space between the pinions, said toothed wheel being always in engagement with said driving and said driven pinions.

In testimony whereof I affix my signature in presence of two witnesses.

MAURICE SCHAAR.

Witnesses:
RENÉ P. WITTEHOLLY,
CHARLES O. JOHNSON.

Copies of this patent may be obtained for five cents each, by addressing the "Commissioner of Patents, Washington, D. C."